United States Patent
Scoggins

(10) Patent No.: US 6,848,433 B2
(45) Date of Patent: Feb. 1, 2005

(54) FLUID COOLING SYSTEM

(76) Inventor: Donald B. Scoggins, 424 32 Rd., #84, Clifton, CO (US) 81520

( * ) Notice: Subject to any disclaimer, the term of this patent is extended or adjusted under 35 U.S.C. 154(b) by 0 days.

(21) Appl. No.: 10/311,447

(22) PCT Filed: Jun. 22, 2001

(86) PCT No.: PCT/US01/19892

§ 371 (c)(1),
(2), (4) Date: Dec. 16, 2002

(87) PCT Pub. No.: WO01/98722

PCT Pub. Date: Dec. 27, 2001

(65) Prior Publication Data

US 2003/0205219 A1 Nov. 6, 2003

Related U.S. Application Data

(60) Provisional application No. 60/213,716, filed on Jun. 22, 2000.

(51) Int. Cl.[7] .................................................. F28D 1/04
(52) U.S. Cl. ..................................... 123/541; 123/559.1
(58) Field of Search ............................... 123/559.1–566, 123/540–541, 41.01–41.85, 198 AB, 563; 165/151, 146, 147

(56) References Cited

U.S. PATENT DOCUMENTS

| | | | | |
|---|---|---|---|---|
| 1,752,879 A | * | 4/1930 | Anderson | 165/151 |
| 2,055,549 A | * | 9/1936 | Modine | 165/146 |
| 3,659,562 A | | 5/1972 | Jones | |
| 4,067,384 A | | 1/1978 | Miyakawa | |
| 6,216,778 B1 | | 4/2001 | Corwin et al. | |

* cited by examiner

Primary Examiner—Marguerite McMahon
(74) Attorney, Agent, or Firm—Christie, Parker & Hale, LLP

(57) ABSTRACT

A fluid cooling system having a heat exchanger (2) with a pressure differential between an inlet area (31) and a cooling area created by use of a venturi between the areas and enhanced flow of cooling medium by use of connecting the output (32) of the exchanger (2) to an exhaust pipe (34).

11 Claims, 16 Drawing Sheets

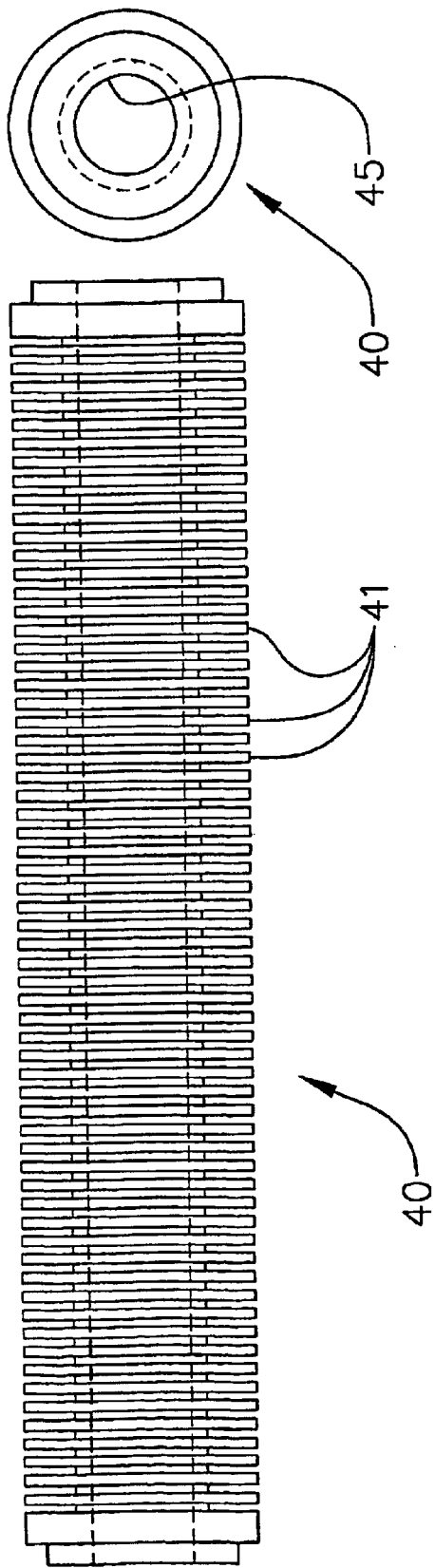

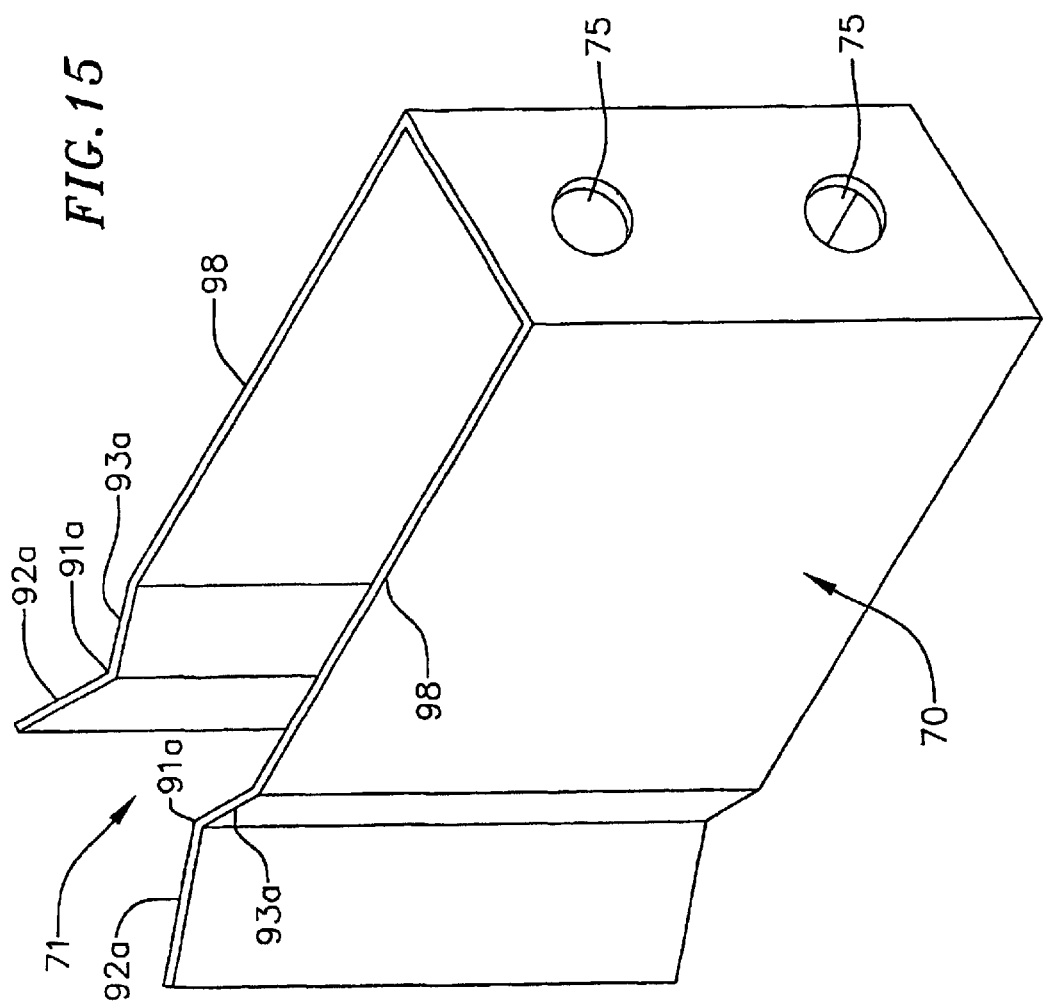

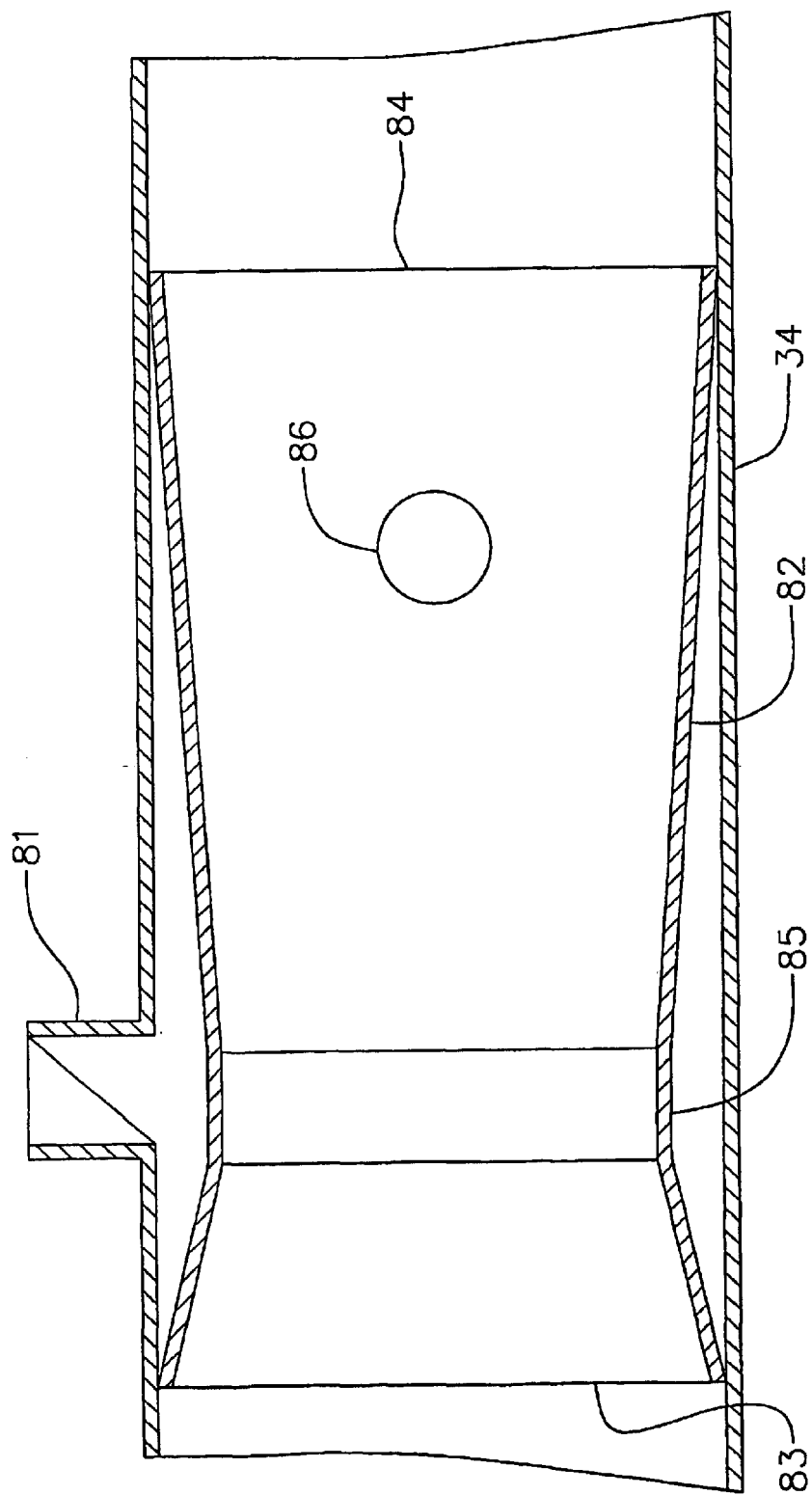

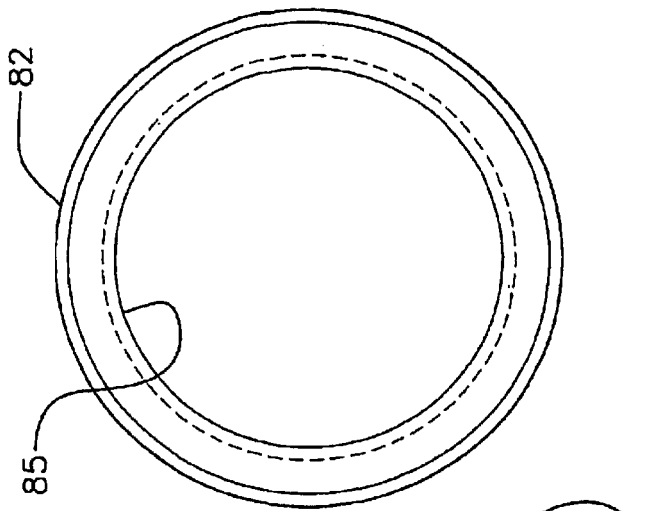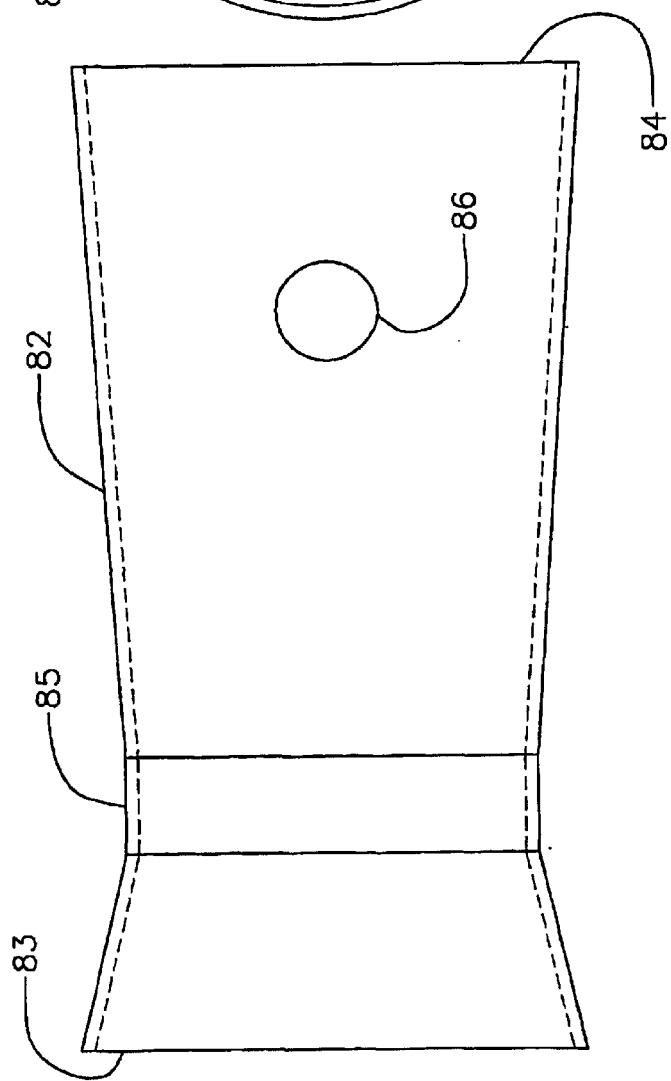

FLUID COOLING SYSTEM

This application claims the benefit of 60/213,716 filed Jun. 22, 2000.

FIELD OF THE INVENTION

This invention relates to the cooling of gases and/or liquids in a heat exchanger formed to provide a pressure difference between the cooling area of the heat exchanger and the input area to the cooling area and to exhaust-driven cooling systems.

BACKGROUND OF THE INVENTION

The cooling of fluids is desirable in many applications. Internal combustion engines run more efficiently if relatively high temperature fuel is cooled before being introduced into the combustion chamber. Advantageously, emissions are reduced and fuel usage is reduced.

Hydraulic systems function better with cooler hydraulic fluid. Oil lubrication systems are more effective when the oil is cooled. This is true in transmissions and other parts of a power train as well as for the internal lubrication of an engine.

SUMMARY OF THE INVENTION

A highly effective fluid cooling system employs a heat exchanger or cooling chamber where heat is removed from the fluid and the heat exchanger is exhaust driven. The density of the cooling medium in the chamber is greater than the density of the gases in the exhaust tube or pipe so that the cooling medium, such as air, flows across the body carrying the fluid to be cooled and out of the chamber and into the exhaust tube or pipe.

To further improve the flow of the cooling medium through the heat exchanger or cooling chamber with or without the exhaust drive, the inlet port for the cooling medium into the chamber has a reduced size compared to the cross-sectional area of the chamber. In this way, a venturi is formed to create a pressure differential and enhance the flow.

A significant application for the fluid cooling system is the cooling of relatively high temperature diesel fuel before injection into the combustion chamber of the diesel engine. Emissions are reduced by improved engine efficiency and fuel consumption is reduced.

Other useful applications for the fluid cooling system employing a heat exchanger with a venturi opening in the inlet area for the cooling medium to create a pressure difference between the inlet area and cooling area include: cooling transmission fluid, cooling the charge air that goes into the intake manifold of an engine, cooling the coolant for an engine and cooling the lubricating oil.

BRIEF DESCRIPTION OF THE DRAWINGS

Preferred and other embodiments of the invention are described below with reference to the accompanying Drawings in which:

FIG. 4 is a front elevation view of a finned cooler tube through which the fluid to be cooled flows in accordance with this invention;

FIG. 5 is an end elevation view of the cooler tube of FIG. 4;

FIG. 15 is a perspective view of the cover for the chamber of the heat exchanger of FIG. 3;

FIG. 16 is a front elevation view of a venturi ejector that couples the pipe from the heat exchanger or the cooling area of the heat exchanger to the exhaust tailpipe with the exhaust tailpipe being shown in cross-section;

FIG. 17 is a front elevation view of the venturi ejector of FIG. 16 separate from the exhaust tailpipe;

FIG. 18 is a top plan view of the ejector of FIG. 17;

DESCRIPTION OF ILLUSTRATED EMBODIMENTS

It should be noted that the designation of the elements of the system as being top, bottom, front, back and so forth, is for illustrative purposes and is not a limitation on the orientation of the components of the system in use.

Figure 1:
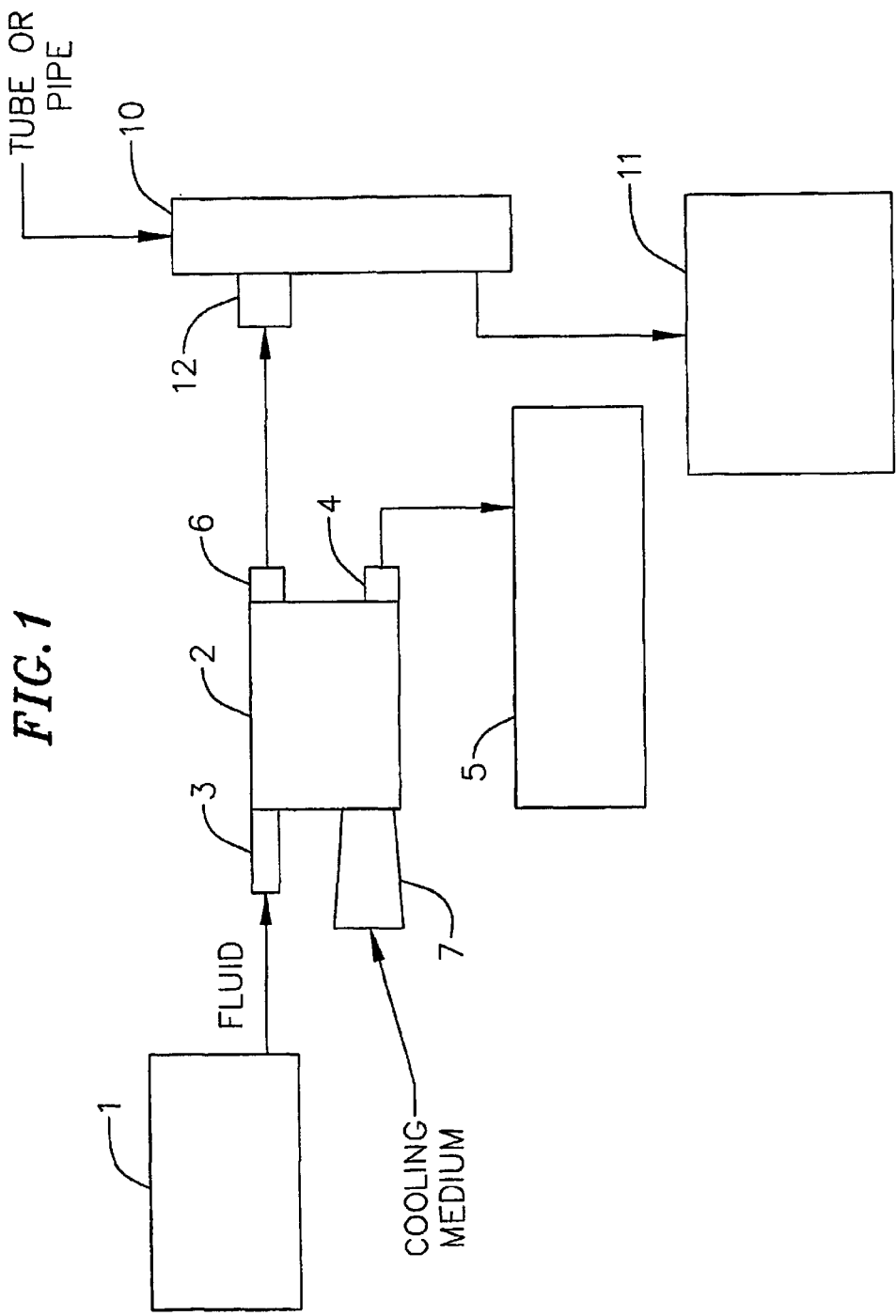
FIG. 1 is a block and schematic diagram of a fluid cooling system in accordance with this invention.

The general fluid cooling system of this invention is shown schematically in FIG. 1 of the drawings. Fluid such as diesel, gasoline, hydraulic oil, lubricating oil or cooling oil, for example, is stored in a container 1.

The system further includes a cooling chamber or heat exchanger 2 having an inlet port 3 and an outlet port 4 for the fluid to be cooled. The heat exchanger or cooling chamber 2 further includes an inlet port 7 and an outlet port 6 for the cooling medium. The inlet port 3 is connected to the container 1 of fluid to be cooled. The heat exchanger or cooling chamber 2 includes a plurality of finned tubes between the inlet port 3 and the outlet port 4 of the chamber 2, FIGS. 3-5. The system further includes an area of use indicated by the block 5, which is coupled to the outlet port 4. To enhance flow through the cooling chamber or heat exchanger 2, the outlet port 6 is connected to an exhaust pipe 10 through an inlet port 12 of the exhaust pipe 10. The exhaust pipe is coupled to a device, such as an internal combustion engine, which may be the area of use 5 or an independent unit 11. In either case, the exhaust of the system is coupled through the exhaust pipe 10.

Figure 2:
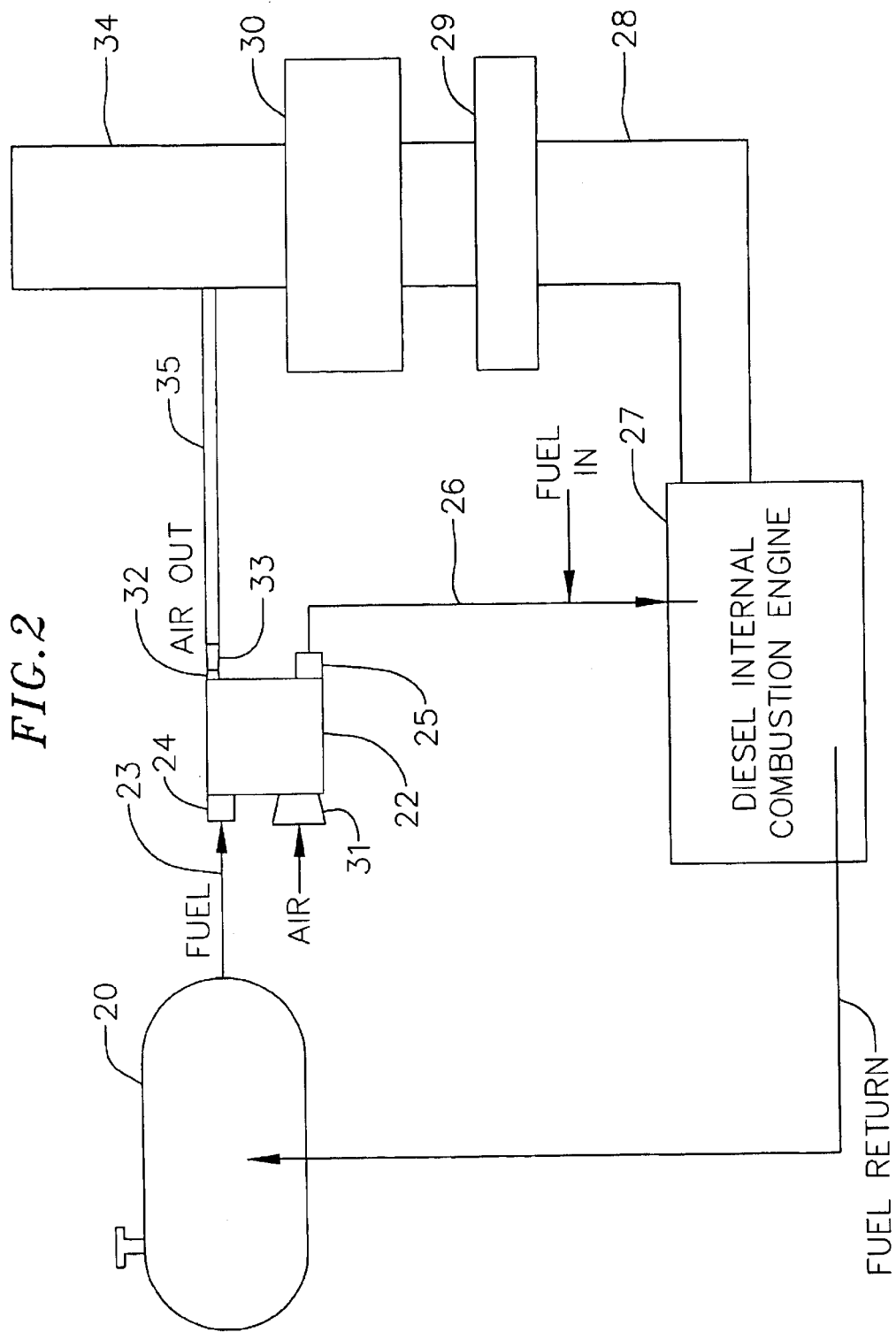
FIG. 2 is a schematic and block diagram of an exhaust-driven diesel fuel cooling system employing air as the cooling medium in accordance with this invention.

Details of a fluid cooling system, particularly useful for diesel fuel used in a diesel internal combustion engine, is shown in FIGS. 2-21. The use of a cooling system with a diesel engine in schematic and block diagram form is shown in FIG. 2. The system includes a tank 20 for storing the fuel to be cooled. The system further includes a cooler chamber or heat exchanger 22, which has an inlet port 24 and an outlet port 25 for the fuel to be cooled. The chamber or heat exchanger 22 further includes an inlet port 31 and an outlet port 32 for the cooling medium, which in this case, is air. The outlet port 25 of the heat exchanger 22 is coupled to the diesel internal combustion engine 27 through a pipe 26. The cooling medium is coupled to the exhaust tailpipe of the internal combustion engine 27 by a pipe 35. The exhaust pipe of the engine includes a muffler 29 and a catalytic converter 30 before the tailpipe portion 34.

The system further includes a venturi 33 at the outlet port 32 between the outlet port 32 and the exhaust pipe 34. This venturi may be omitted. A cooling medium, such as ambient air, flows through the cooling chamber 22 to cool the fuel. The air enters the chamber 22 through an inlet port 31 and exits the chamber 22 through the outlet port 32. The flow of exhaust gases across the opening into the exhaust tailpipe 34 for the pipe 35 creates a low-pressure area relative to the pressure inside the cooling chamber 22 experienced by the air. As a consequence, the airflow through the cooler and to the exhaust tailpipe is enhanced. The inlet port 31 is an orifice 71 created by a cover 70, shown in FIG. 15, and the extensions of the top and bottom cooler manifolds into the inlet area shown in FIGS. 6, 7 and 8.

Figure 3:
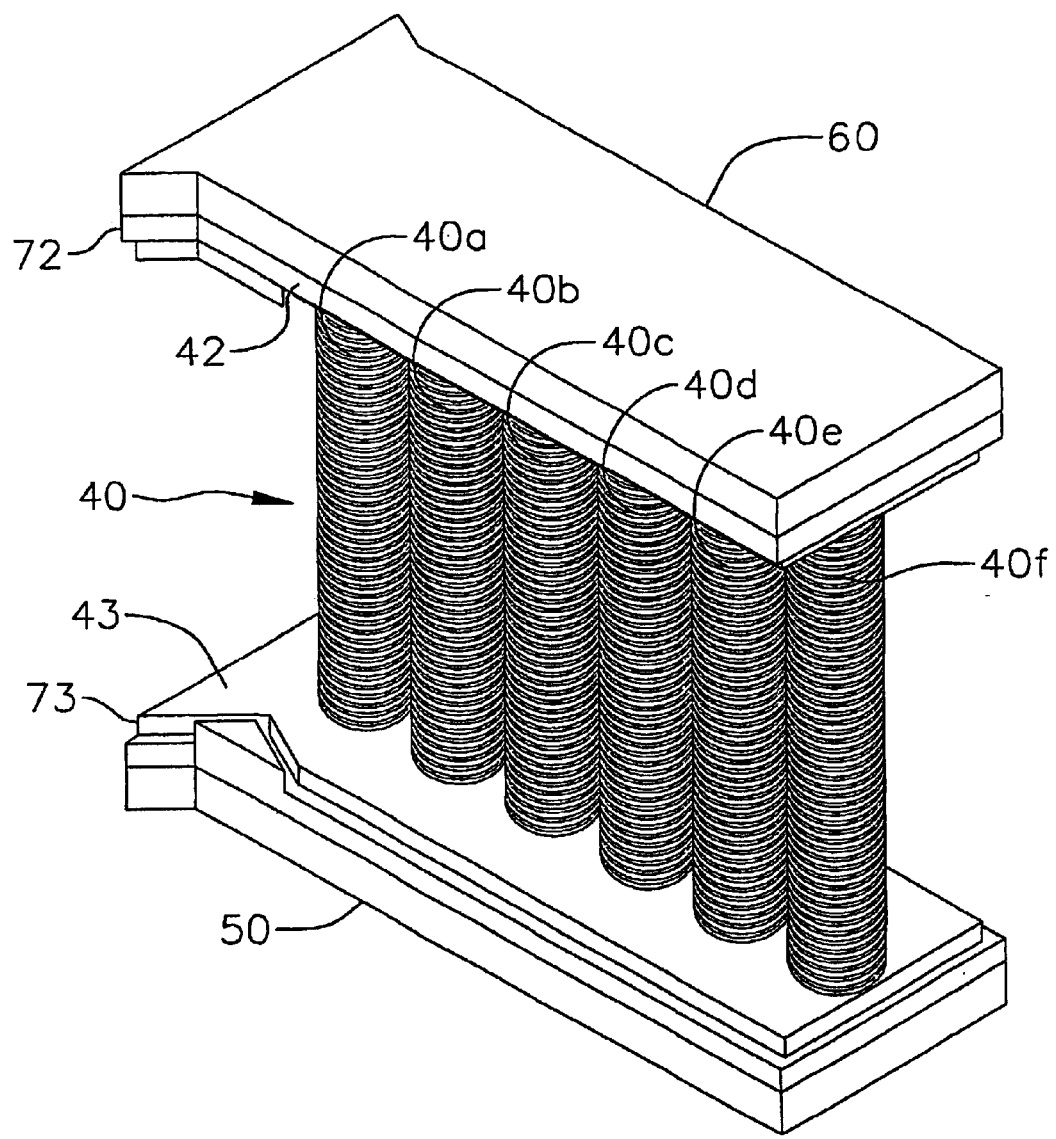
FIG. 3 is a perspective view of the cooling area and inlet area of the heat exchanger, with the cover removed, in accordance with this invention.

The heat exchanger or cooling chamber 22 is shown assembled in FIG. 3 with the exterior cover 70 removed. Referring to FIG. 3, the cooling area of the chamber 22 includes a plurality of finned cooler tubes 40, which are six in number, for a vehicular diesel engine. The cooler tubes 40 carry the fuel or other medium to be cooled through the chamber 22. The detail of the cooler tubes 40 is shown in FIGS. 4 and 5. The tubes have a number of fins 41 for carrying the heat from the fluid or fuel that is flowing inside the cooler tubes 40 to cool this fluid.

The cooling chamber 22 further includes a top cooler tube manifold 42 and a bottom cooler manifold 43. These manifolds 42 and 43 are identical and are shown in detail in FIGS. 6-8. Each manifold 42 and 43 has a plurality of seats 44 with a diameter and thus circumference equal to the outer diameter and circumference of the cooler tubes 40 to receive an end of the cooler tube. An inner tube 45 of the cooler tube 40, as seen in FIG. 5, mates with the opening 46 in the manifold 42 or 43, to carry the fluid to be cooled through the manifold. The cooling chamber also includes a bottom cooler jumper manifold 50 shown in detail in FIGS. 9-11.

Figure 9:
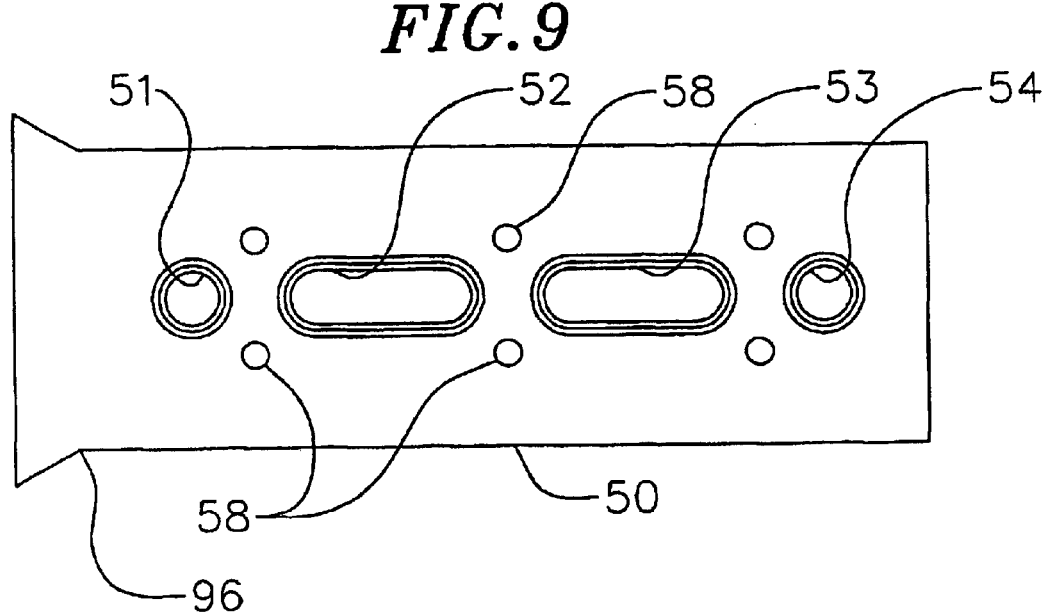
FIG. 9 is a top plan view of the bottom jumper manifold for the heat exchanger having the inlet port and the outlet port for the fluid to be cooled in the heat exchanger and passages for serial flow through the cooling tubes of the medium to be cooled.
Figure 10:
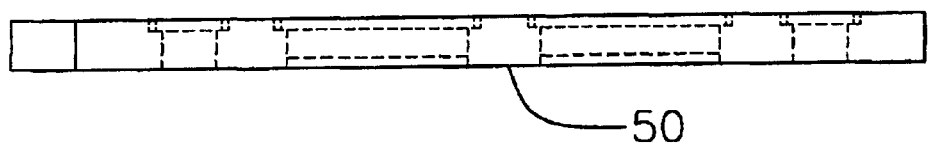
FIG. 10 is a front elevation view of the bottom jumper manifold of FIG. 9.
Figure 11:
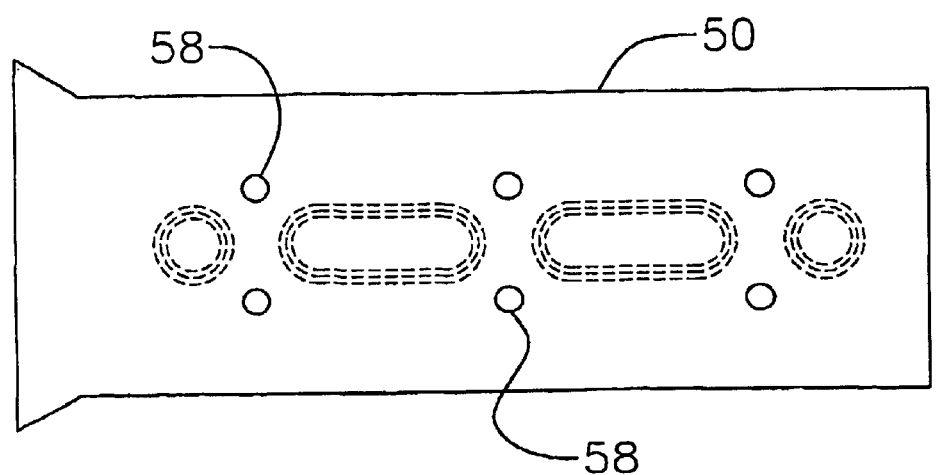
FIG. 11 is a bottom plan view of the manifold of FIG. 9.
Figure 12:
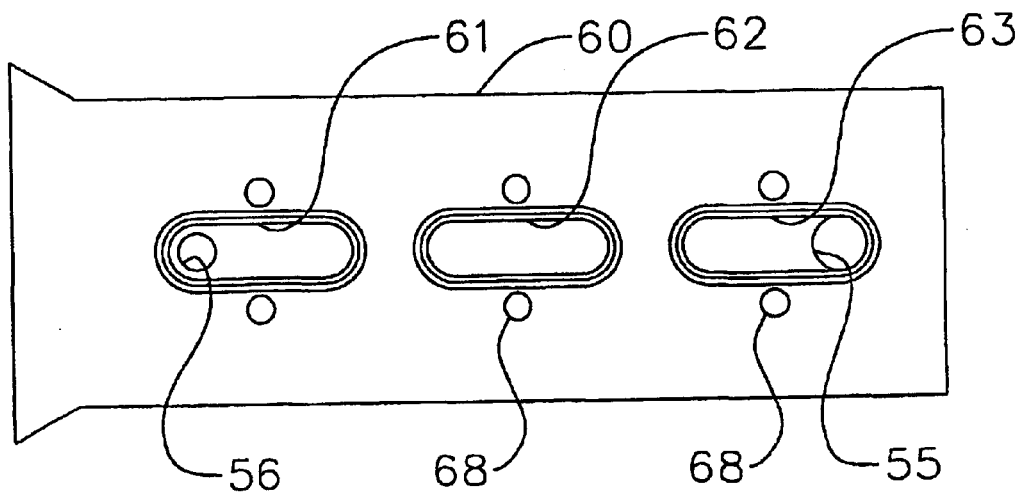
FIG. 12 is a bottom plan view of the top jumper manifold for the heat exchanger.
Figure 13:
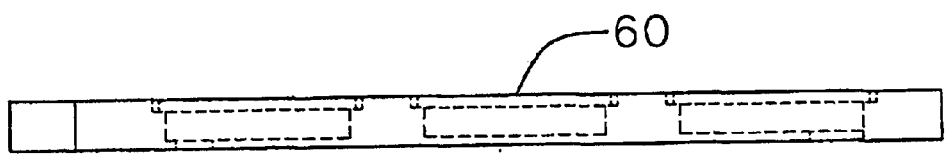
FIG. 13 is a front elevation view of the manifold of FIG. 12.
Figure 14:
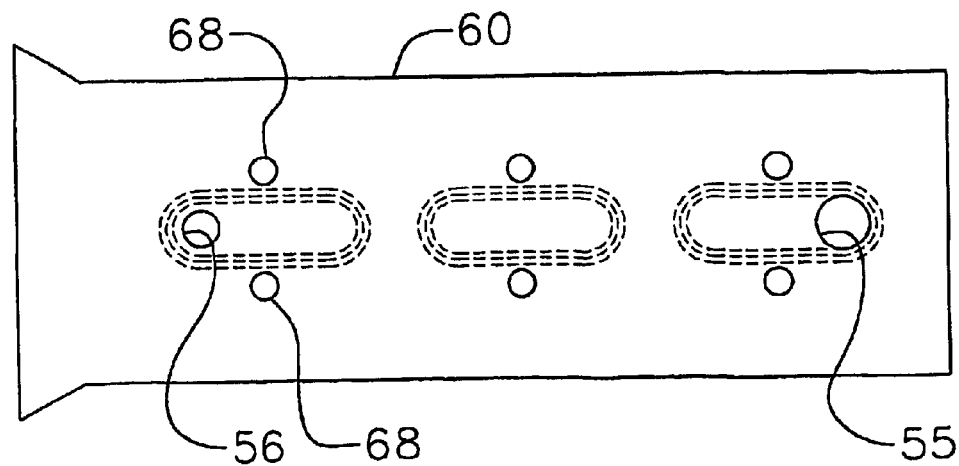
FIG. 14 is a top plan view of the manifold of FIG. 12.
Figure 19:
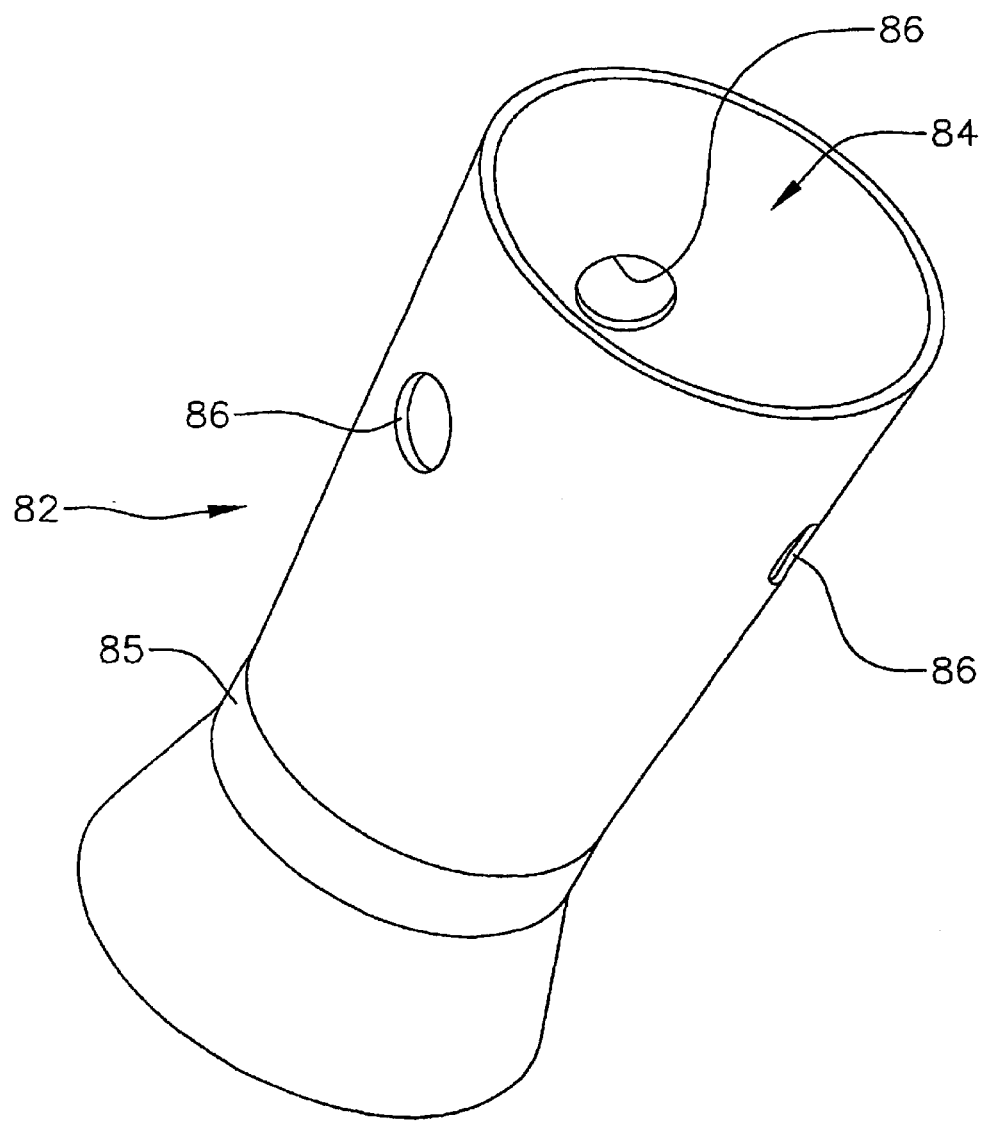
FIG. 19 is a perspective view of the venturi ejector of FIGS. 16-18.

Manifold 50, FIGS. 9-11, is dimensioned to have passages for individual cooler tubes 40 and to have space between the cooler tubes. A passage 51 serves as an inlet port for the fluid or fuel to be cooled and couples the fuel to the first cooler tube 40a, as shown in FIG. 3. The fuel flows through cooler tube 40a and the top cooler tube manifold 42 to enter a top cooler jumper manifold 60. Manifold 60 is shown in detail in FIGS. 12-14. Manifold 50, FIGS. 9-11, has a first coupling passage 52 to couple the fluid from the second cooler tube 40b to the third cooler tube 40c. A second coupling passage 53 couples the fluid from the fourth cooler tube 40d to the fifth cooler tube 40e, all as shown in FIG. 3.

A second single cooler tube passage 54 in manifold 50 serves as an outlet from the cooling chamber 22 for the cooled fuel. Bolt holes 58 (six in number) are spaced over the surface of manifold 50. These bolt holes 58 correspond with bolt holes 68 (also six in number) in manifold 60 to accommodate bolts with nuts (not shown) to secure the cooling chamber together as shown in FIG. 3. Cooler jumper manifold 60, FIGS. 12-14, has three coupling passages 61, 62 and 63 (shown in dashed lines in FIGS. 12 and 13). The first coupling passage 61 couples the cooler tubes 40a and 40b. The second coupling passage 62 couples the cooler tubes 40c and 40d. The third coupling passage 63 couples the cooler tubes 40e and 40f.

Manifold 60 further includes a port 55 that communicates with the passage 63 to provide access to the fuel at the output of the cooling chamber 22. This access is useful for insertion of a fuel temperature sensor (not shown) to provide the temperature of the cooled fuel for use in controlling the engine 27.

Placement of cooling system when used as a fuel cooling system on an electronic controlled diesel engine is important. Electronic unit injected engines that have a fuel temperature sender as one of the loops that control air to fuel ratio can mechanically interface to the electronic control module and therefore change timing and injector pulse width to yield optimum efficiency and decreased fuel consumption. The improved timing and pulse width decreases in cylinder temperature spikes that cause nitrogen oxides ($NO_x$).

At the input end of cooler jumper manifold 60, a second port 56 is provided. This port 56 communicates with the passage 61 to provide access to the fuel at the input of the cooling chamber 22. This port 56 is useful for injecting a catalyst into the fuel being cooled for improved operation and efficiency of the internal combustion engine with a resulting reduction of emissions from the engine 27. Additionally, the port may be used for monitoring the temperature or other parameters of the fuel or other fluid at the input to the cooling chamber 22.

The cover 70 for the cooling chamber 22 is shown in FIG. 15. An orifice 71 or inlet area formed by cover 70 and extensions 72 and 73 of cooler tube manifolds 42 and 43, respectively, corresponds to inlet port 31 of FIG. 2. The cover 70 has side walls 92a in the inlet area that are angled relative to the main side walls 98 of the cover 70 that enclose the cooling area of the heat exchanger 2 and 22. The angled side walls 92a form a narrow opening where an apex 91a results. The cover 70 has side walls 93a that begin the cooling area of the exchanger 2 and 22 and that are angled away from the apex 91a and meet the parallel main side walls 98. This creates a venturi in the opening into the chamber. The volume ratio for cooling diesel is in the range of 2.44:1 to 4:1 with an optimum of 3.77:1. This volume ratio is different for different fluids to be cooled. For example, the volume ratio for gasoline is in the range of 2:1 to 3:1 with an optimum of 2.54:1.

The cover 70 has one or more outlet ports 75 in an end wall 96 depending on the application of the cooling chamber. A diesel vehicle typically has one or two exhaust stacks as needed for the size of internal combustion engine being used. If the vehicle has two stacks, then the cover 70 will advantageously have two outlet ports 75. These outlet ports 75 correspond to the outlet port 32 of FIG. 2. The outlet ports 75 can be located anywhere along the length of the end wall 96. The location shown in FIG. 15 does not correspond to the more detailed drawing of the outlet venturis 33 shown in FIGS. 20 and 21.

Figure 6:
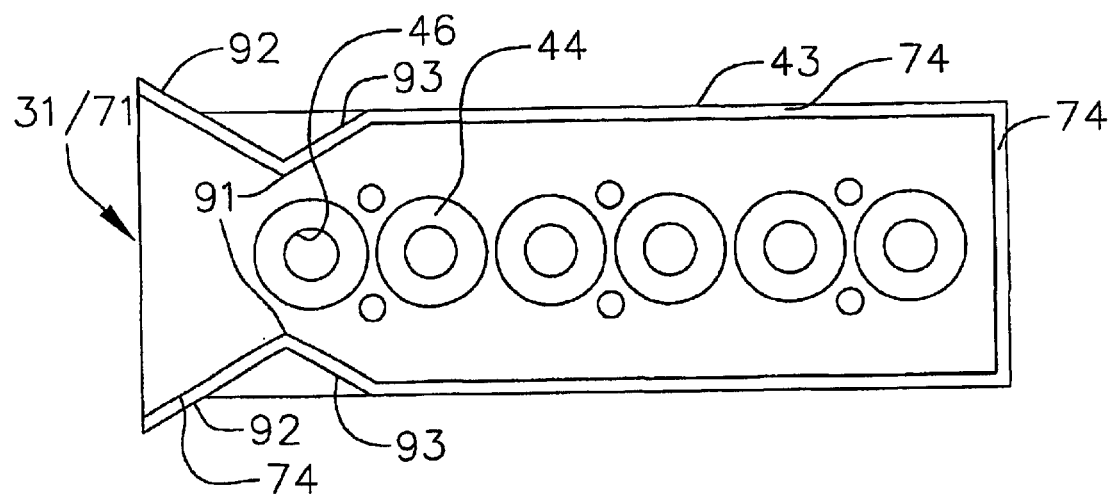
FIG. 6 is a top plan view of a cooler tube manifold, two being used for the cooler tubes of the heat exchanger, one at one end of the cooler tubes on the bottom of the chamber, and the second manifold at the other end of the cooler tubes on the top of the chamber in accordance with this invention.

Cover 70 fits in grooves of the cooler tube manifolds 42 and 43. A groove 74 around to periphery of manifold 43 is shown in FIG. 6. A corresponding groove is in manifold 42. As noted above, manifolds 42 and 43 are identical with one being at one end of the cooler tubes 40 and the other being at the other end of the cooler tubes 40. The cover 70 and grooves 74 cooperate when the cooling chamber 22 as assembled to provide an airtight seal around the chamber so that the cooling medium flows through the chamber 22 from the inlet port 31 or orifice 71, across the fins of the cooler tubes 40, to the outlet port 75.

The outlet port 75 (corresponding to outlet port 32 of FIG. 2) is connected directly to the exhaust tailpipe 34 through pipe 35 or through a venturi 33 and the pipe 35 to the exhaust tailpipe 34, as shown in FIG. 2.

The connection to the exhaust tailpipe 34 provides an exhaust-driven fluid cooling system. The cooling medium is drawn through the cooling chamber 22 and out the exhaust tailpipe 34 by differences in the temperature and pressure in the cooling chamber 22 and the exhaust tailpipe 34. A venturi 33 between the chamber 22 and tailpipe 34 enhances the flow of the cooling medium.

The connection between the chamber 22 and tailpipe 34 is shown in FIG. 16. An inlet port 81 is provided in the side of the tailpipe 34. A venturi 82 is located inside the tailpipe 34. The venturi 82 is shown in front elevation in cross-section in a cross-sectioned tailpipe 34 in FIG. 16.

The design of this venturi 82 is shown in FIGS. 17 and 18. The venturi 82 has an inlet orifice 83 on the internal combustion engine 27 side of the tailpipe 34. An outlet orifice 84 is on the outlet side of the tailpipe 34. This venturi 82 is designed to fit inside a 5-inch inside diameter tailpipe.

The venturi 82 has a necked-down portion or reduced cross-sectional portion 85 that is positioned in the tailpipe 34 near the inlet port 81. There are three holes 86 (best seen in FIG. 19) spaced 120 degrees apart around the periphery of the venturi 82 in the angled portion of the venturi 82 between the necked-down portion 85 and the outlet port 84.

The cooling medium from the cooling chamber 22 flows into the tailpipe 34 through inlet port 81, around the outside of venturi 82, through the holes 86 and out the tailpipe 34 with the exhaust gases from the internal combustion engine 27.

Figure 20:
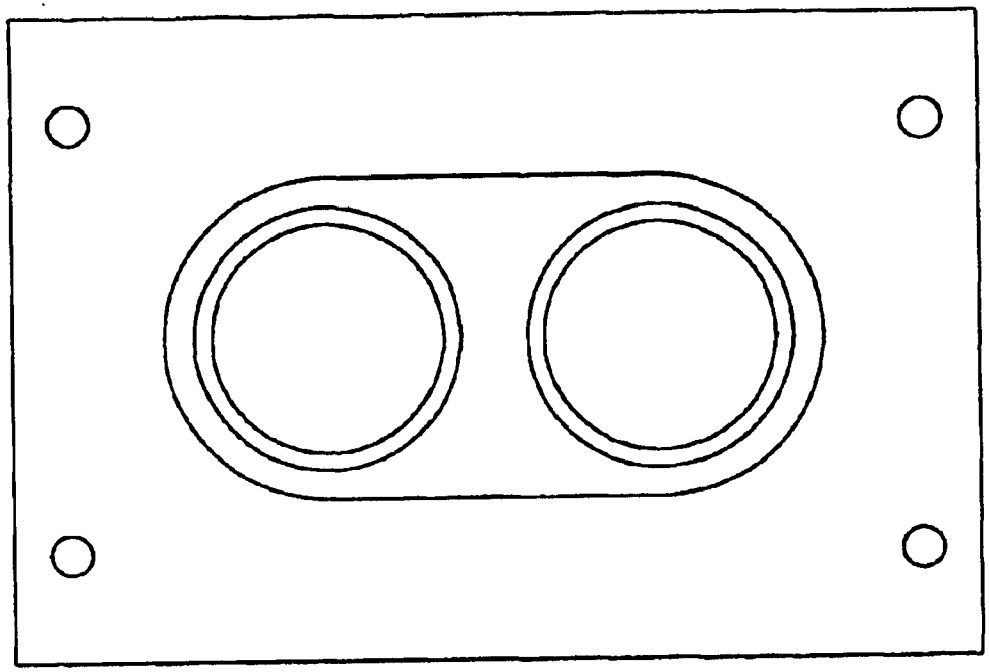
FIG. 20 is a top plan view of a pair of venturi positioned between a heat exchanger and a tailpipe.
Figure 21:
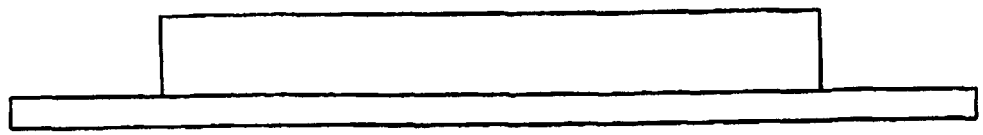
FIG. 21 is a front elevation view of the pair of venturi of FIG. 20.

The design of the venturis 33 of FIG. 2 is shown in FIGS. 20 and 21, with two venturis being shown for use with two exhaust pipes.

When exhaust venturi, turbocharger, or supercharger driven cooling medium, (fresh air), is introduced into the engine exhaust pipe a diffusion of the gases occurs and changes the constituents of the exhaust emissions. This denotes an effective air induction system for diesel engines.

The size of pipe, size and number of cooler tubes, size of cooling chamber, size and location of venturi tubes, and number of outlet and inlet ports of the fluid cooling system depends on the application of the system, including fluid being cooled and cooling medium being employed.

The elements of the heat exchanger or cooling chamber 22 of this invention have the following dimensions when designed for use with a vehicular diesel engine and particularly those in Class 6, 7 and 8. Class 8 diesel engines, for example, have a horsepower between 400 and 600 and a displacement between 763 and 893 cubic inches. A specific example of such an engine is a Detroit Diesel 60 series, having a displacement of 775 cubic inches and a horsepower rating of 425. Vehicular diesel engines are manufactured by a number of companies including, for example, Caterpillar, Detroit Diesel, Cummins and Volvo.

The cooler tubes shown in FIG. 4 and FIG. 5 are 6.4625 inches in overall length and 5.9625 inches in the internal area where the fins are located. The inner tube opening 45 is 0.50 inches in diameter and the overall outer diameter of the cooling tube is 1.1250 inches. Each fin has a thickness of 0.0375 inches with a gap between fins of 0.0625 inches. The groove depth of each fin is 0.2375 inches. The top and bottom cooler manifolds 42 and 43 have a width of three inches and an overall length of nine inches.

Figure 7:
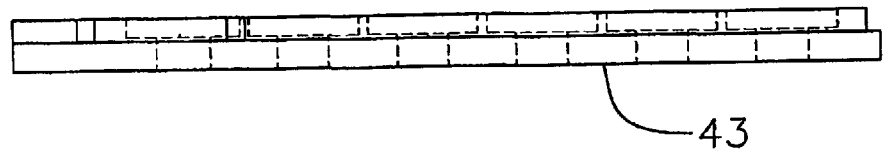
FIG. 7 is a front elevation view of the manifold of FIG. 6 showing the recesses for receiving the ends of the cooler tubes in dotted lines.
Figure 8:
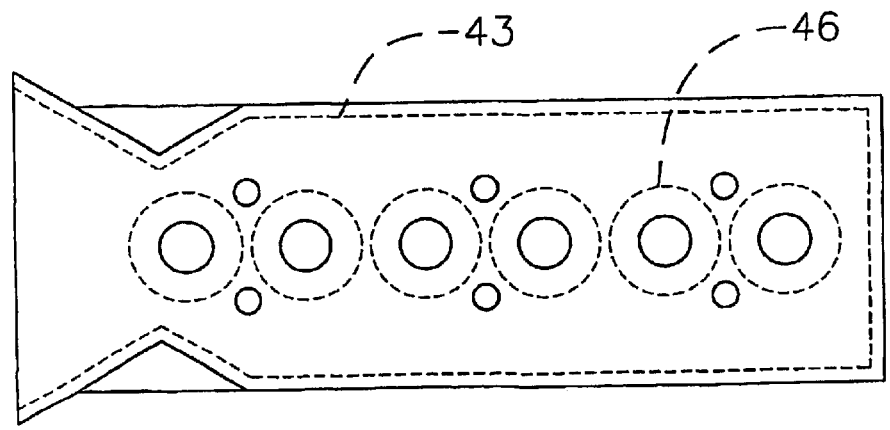
FIG. 8 is a bottom plan view of the manifold of FIG. 6.

The end where the input port 31 is located has a wider dimension than the overall body of the manifold. This dimension is 3.7113 inches. The end at the inlet port 31 is angled down to the narrow opening or apex 91. The angle at the apex is 120 degrees formed by angled side 92 and angled side 93. Angled side 93 extends from the apex 91 to the exterior width of the manifold. The overall depth of the manifold, as seen in FIG. 7, is 0.50 inches. The depth of the seats 44 is 0.2250 inches.

The bottom cooler jumper 50, shown in FIGS. 9-11, has an overall width of three inches that widens to 3.7113 inches at the inlet port 31 end of the manifold. The overall length of the manifold is nine inches with an angle 96 at the point where the width of the manifold widens at the inlet port 31 end. The length of the manifold from the angle 96 to the end remote from the input end 31 is 8.384 inches. The top cooler jumper 60, shown in FIGS. 12-14, has a corresponding width and length to that of the bottom cooler jumper 50. The coupling passages of cooler jumpers 50 and 60 provide for serial flow of the fluid to be cooled through the cooling tubes 40 when assembled as shown in FIG. 3. For some applications, it is desirable to have parallel flow through the cooling tubes when assembled as shown in FIG. 3.

Figure 26:
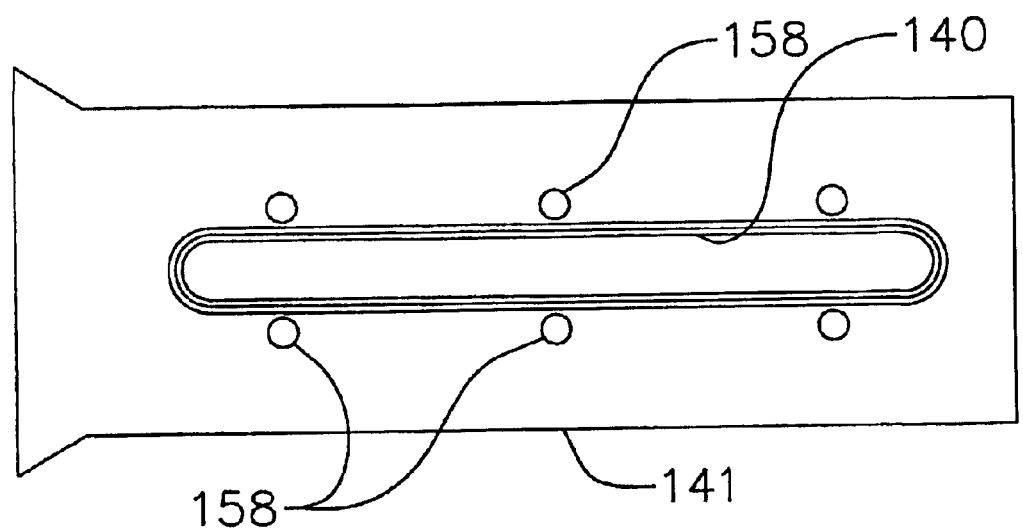
FIG. 26 is a top plan view of the bottom jumper manifold for a heat exchanger for parallel flow through the cooling tubes of the medium to be cooled in accordance with this invention.

A bottom cooler jumper for a parallel flow is shown in FIG. 26. The cooler jumper 141 of FIG. 26 has one slot 140 that replaces the coupling passages 52 and 53 and input passages and outlet passages 51 and 54 so that fluid in the cooler jumper 141 communicates with each of the cooling tubes 40 and the fluid flows in parallel through the tubes. One of the cooler jumper manifolds has an inlet port and the other manifold at the other end of the cooler tubes has an outlet port.

An alternative venturi to venturi 82 is shown in FIGS. 22-25. The venturi includes a curved surface 110 that corresponds to the curved surface of the exhaust tailpipe in which the venturi was placed. For example, if the venturi is placed in a 4-inch exhaust tailpipe, then the curved surface 110 will have a radius that corresponds to a 4-inch diameter.

Figure 22:
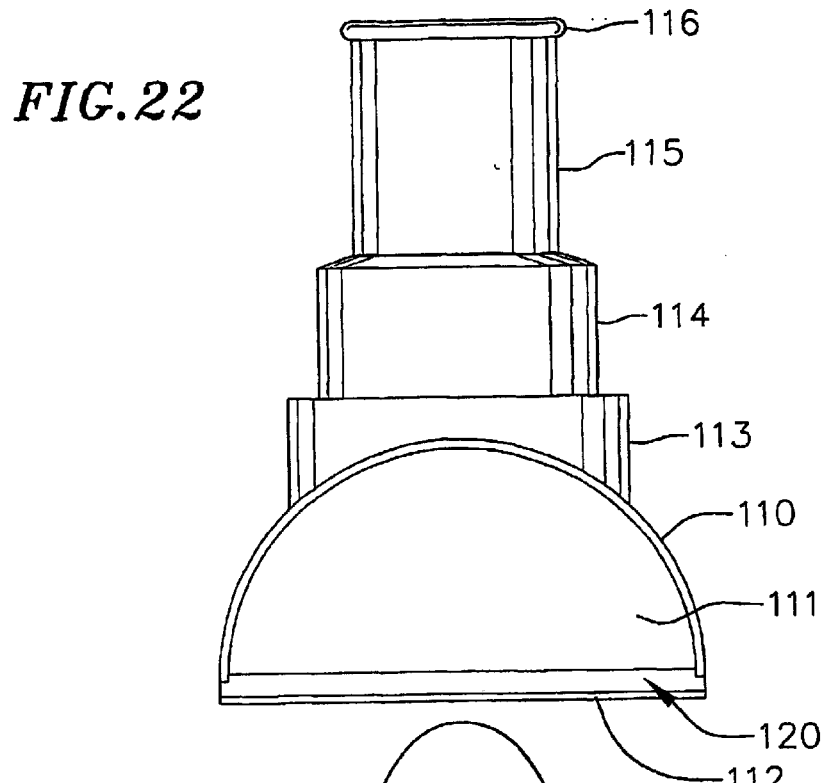
FIG. 22 is a top plan view of an alternative venturi placed inside of the tailpipe.

Similarly, if the venturi is placed in a 5-inch exhaust tailpipe, the curved surface 110 will have a radius that corresponds to a 5-inch diameter. The venturi further includes a flat plate 111 that covers the upper part of the opening of the curved surface 110. A flat plate 112 covers the lower part of the curved surface of 110. The flat plates 111 and 112 do not touch but rather leave an opening 120 between the two flat plates. There is an opening in the curved surface 110 to provide for coupling of the venturi 100 to a heat exchanger or cooling chamber 2, as shown in FIG. 1, or 22, as shown in FIG. 2.

Figure 23:
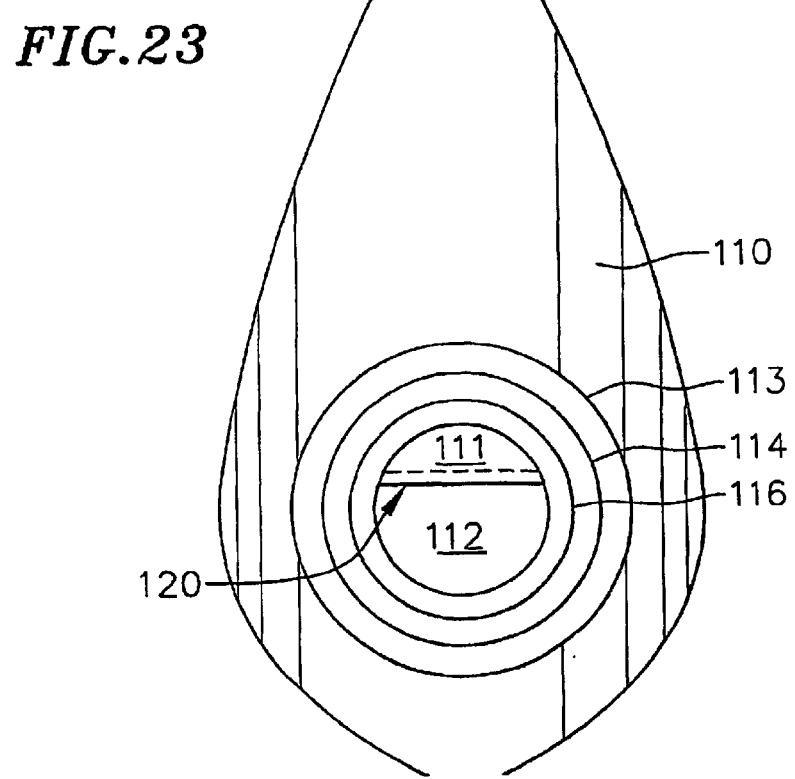
FIG. 23 is a right side elevation of the alternative venturi of FIG. 22.
Figure 24:
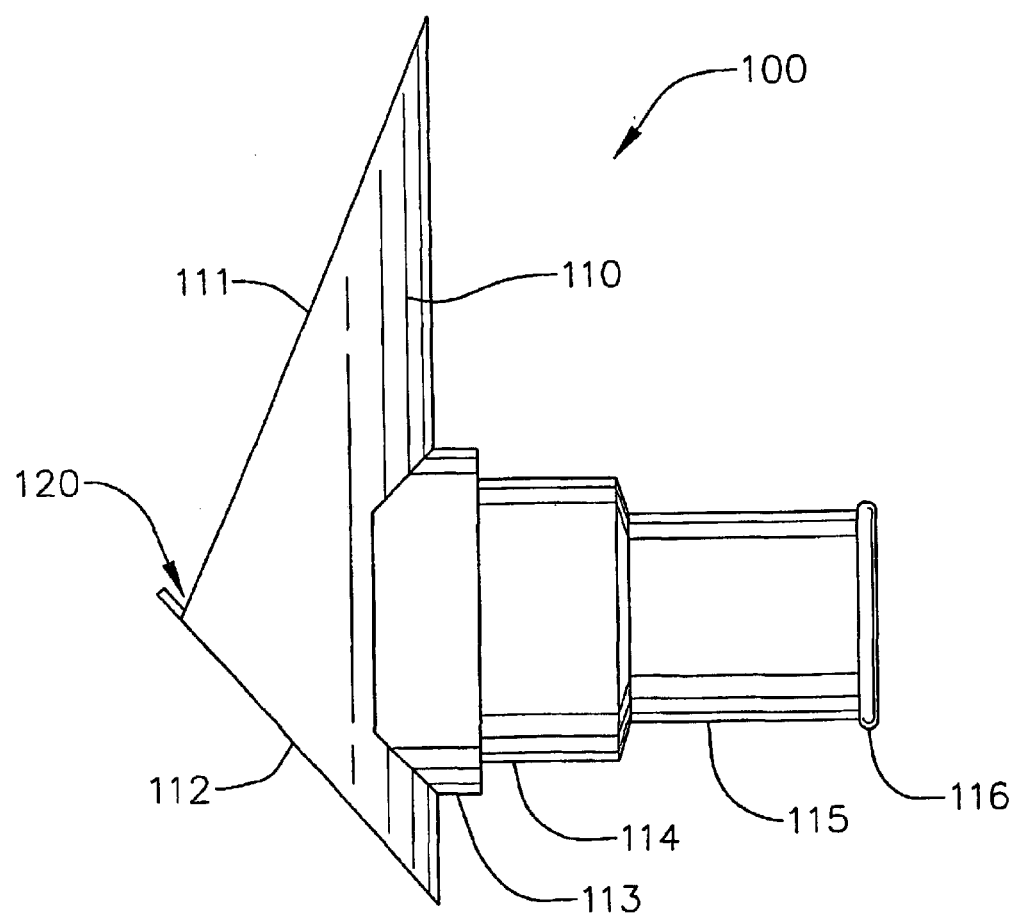
FIG. 24 is a front elevation view of the venturi of FIG. 22.

The venturi 100 includes a sealing washer 113 that is mounted between a nipple 114 and a curved surface 110 to make an airtight seal at the opening through curved surface 110 into the venturi 100. Extending from the nipple 114 is a coupling tube 115. The coupling tube 115 ends in a sealing ring 116 that accommodates a flexible coupling tube, such as rubber, that may be slipped over the sealing ring 116 and clamped onto the coupling tube 115 to provide the coupling between the cooling chamber 2 or 22 and the exhaust tailpipe 10 or 34. The venturi 100 is shown in place in the exhaust tailpipe 34 in FIG. 25. The width of the venturi, as shown in FIG. 23, in the area where flat plate 111 and flat plate 112 are nearest each other, is approximately 3½ inches for a 4-inch exhaust tailpipe so that the venturi occupies about 30% of the cross-section of the tailpipe in the area of the opening 120. The overall length of the venturi is approximately 7½ inches. The length of flat plate 111 is approximately 4¾ inches and the length of flat plate 112 is approximately 3¼ inches. The plate 112 extends at an angle greater than the angle of plate 111 and, thus, beyond the end of plate 111 at the opening 120. The venturi 100 is placed in the exhaust pipe 34 with the flat plate 112 toward the internal combustion engine and the flat plate 111 toward the exhaust end of the pipe 34.

Figure 25:
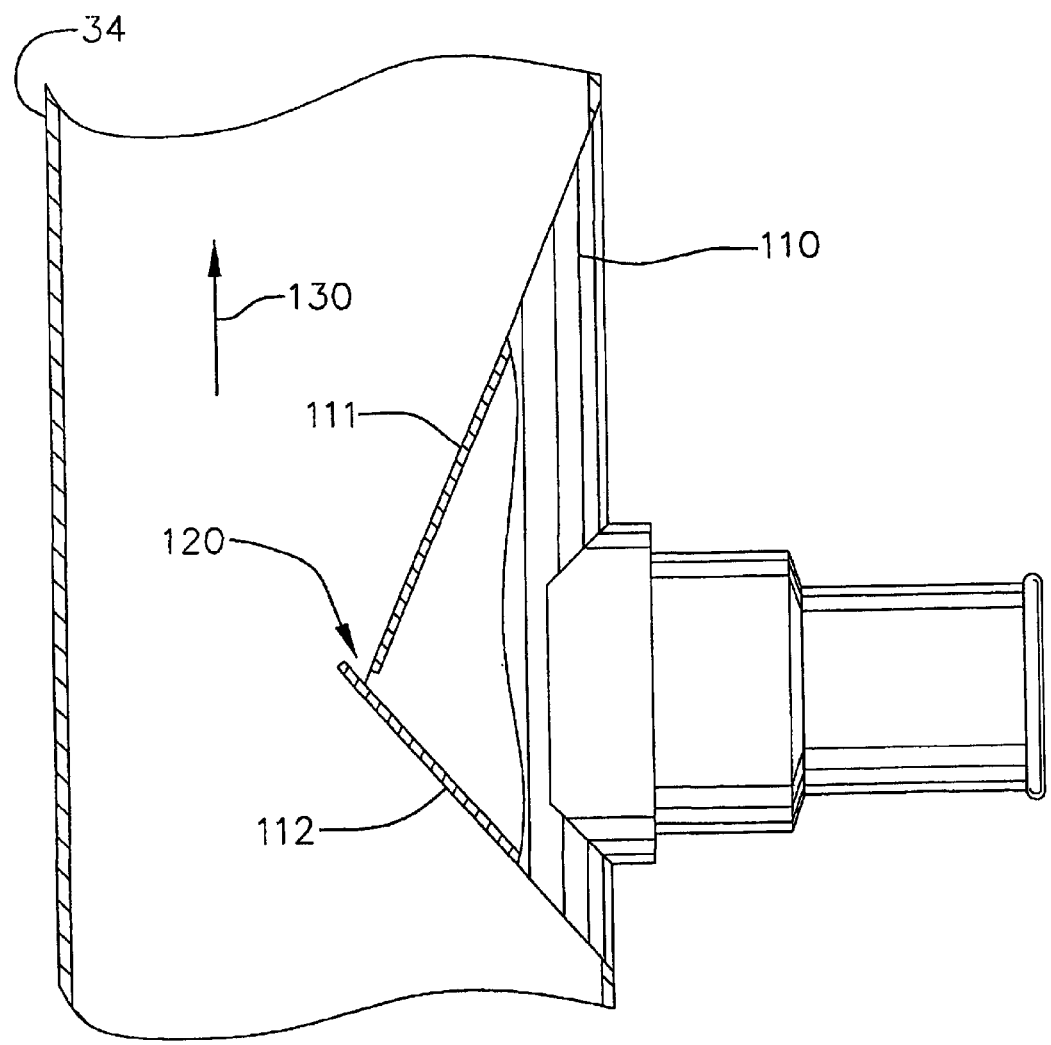
FIG. 25 is a front elevation view of the venturi of FIG. 22 partially in cross-section in place inside the exhaust pipe.

The direction of the exhaust gas flow through the exhaust tailpipe 34 is shown by an arrow 130 in FIG. 25.

The internal pressure of the chamber is varied by the volume of the cooling area compared to the volume of the inlet area. The volume of the cooling area, which includes the cooling tubes 40, is between 2.0 and 12.0 times larger than the volume of the inlet area of port 31. The limit ambient temperature (LAT) of the cooling medium that passes through the chamber 22 or 2 from ports 31 to 32 or ports 7 to 6 is changed by the operation of the chamber. The temperature inside the chamber is varied by controlling the effusion rate through the outlet port 32 or outlet port 6.

The difference in volume of the inlet port 31 or orifice 71 and the cooling chamber portion, which includes the cooling tubes 40, sets up a volume ratio for pressure differential, but does not control temperature differential. The temperature differential is controlled by the effusion rate, which is generally measured in cubic feet per minute (CFM). By effusing more medium through the outlet ports of the cooling chamber or heat exchanger, a temperature differential as well as the pressure differential is created. Effusion rates may be driven by a venturi, as discussed above with the venturi in the exhaust stack, or may be driven by the intake of a turbocharger or a supercharger.

Common temperature ratios experienced with the fluid cooling system of this invention is a temperature at the output of the cooling medium port 6 or 32 of 0.75 to 0.83 of the temperature at the input to the cooling chamber 2 or 22. At these temperature ratios, the effusion rate at 125 CFM is 5,663 feet per minute measured when the outlet tube or pipe 35 is a two-inch circular exit pipe. These rates and temperatures occur when using the exhaust venturi of FIGS. 22-25 to create the effusion rate.

One reason to employ a venturi in the exhaust pipe to create an effusion rate is that when the system is used as a fuel cooler in a diesel engine, if there is a leak between ports 3 and 4 of FIG. 1, the air will not be introduced into the combustion chamber of the diesel engine as uncontrolled fuel. When the system is used as a charge air cooler, the effusion rate is created on the intake side of a turbocharger or supercharger. The heat exchanger may be employed to cool hot exhaust gases where the exhaust gases pass through the interior of the cooling tubes 40 and the cooled exhaust gases are reintroduced into the combustion chamber as the exhaust gas recirculation.

The form of the chamber used to lower LAT of the cooling medium can be used to cool other items rather than liquids, such as electronic components or to provide a means for replacing Freon driven air conditioning systems.

Although preferred embodiments of the fluid cooling system have been shown and described above, the invention is not limited to these specific embodiments, but rather the scope of the invention is to be determined as claimed.

What is claimed is:

1. Fluid cooling system comprising a heat exchanger having at least one inlet port and one outlet port for a cooling medium and at least one inlet port and one outlet port for a medium to be cooled; the inlet port for the cooling medium including a venturi opening; and a second venturi having an inlet coupled to the cooling medium outlet port.

2. A fluid cooling system in accordance with claim 1 wherein the second venturi is mounted in an exhaust pipe of an engine.

3. Fluid cooling system for an internal combustion engine having an exhaust system, the fluid cooling system comprising a heat exchanger having at least one inlet port and one outlet port for a cooling medium and at least one inlet port and one outlet port for a medium to be cooled; the inlet port for the cooling medium including a venturi opening; and a flow passage coupled from the cooling medium outlet port to the engine exhaust system.

4. A fluid cooling system in accordance with claim 1 wherein the heat exchanger has a chamber having a plurality of cooling tubes mounted inside the heat exchanger for serial flow through the tubes of the medium to be cooled.

5. A fluid cooling system in accordance with claim 1 wherein the heat exchanger has a plurality of cooling tubes mounted inside the heat exchanger in a cooling chamber for parallel flow of the medium to be cooled through the tubes.

6. In combination with a diesel engine, a diesel fuel cooling system comprising a heat exchanger having at least one inlet port and one outlet port for a cooling medium and at least one inlet port and one outlet port for fuel to be cooled, the inlet port for the cooling medium including a venturi opening, and an exhaust venturi located in the exhaust pipe of the diesel truck and a pipe coupling the outlet port for the cooling medium from the heat exchanger to the inlet of the exhaust venturi.

7. A diesel fuel cooling system in accordance with claim 6 wherein the exhaust venturi includes a curved surface matable in a venturi coupling opening of the exhaust pipe, and inclined first and second plates connected to the curved surface to form a volume with the curved surface and, upon mating to the curved surface in the coupling opening, to define an aperture to said volume from the pipe at a location in the pipe spaced from the curved surface.

8. Fluid cooling system comprising a heat exchanger having at least one inlet port and one outlet port for a cooling medium and at least one inlet port and one outlet port for a medium to be cooled; the inlet port for the cooling medium including a venturi opening; and in which the effusion rate of the cooling medium from the heat exchanger is enhanced by a venturi connected to the outlet port of the heat exchanger for the cooling medium.

9. Fluid cooling system for an internal combustion engine having an exhaust system, the fluid cooling system comprising a heat exchanger having at least one inlet port and one outlet port for a cooling medium and at least one inlet port and one outlet port for a medium to be cooled; the inlet port of the cooling medium including a venturi opening; and in which the effusion rate of the cooling medium at the outlet port of the heat exchanger is enhanced by a turbocharger connected to the outlet port of the heat exchanger and discharging to the engine exhaust system.

10. Fluid cooling system for an internal combustion engine having an exhaust system, the fluid cooling system comprising a heat exchanger having at least one inlet port and one outlet port for a cooling medium and at least one inlet port and one outlet port for a medium to be cooled; the inlet port for the cooling medium including a venturi opening; and in which the effusion rate of the cooling medium from the heat exchanger at the outlet port of the heat exchanger is enhanced by a supercharger connected to the outlet port of the heat exchanger and discharging to the engine exhaust system.

11. In combination with a diesel engine having an exhaust system, a fuel cooling system comprising a heat exchanger having at least one air inlet port and one air outlet port for cooling air and at least one fuel inlet port and one fuel outlet port for fuel to be cooled, the air inlet port including a venturi opening, the fuel inlet and outlet ports being connected in a fuel flow path from a fuel tank to the engine, the air outlet port being connected to the engine exhaust system via a path which includes a mechanism which draws air through the heat exchanger during operation of the engine.

* * * * *

UNITED STATES PATENT AND TRADEMARK OFFICE
CERTIFICATE OF CORRECTION

PATENT NO. : 6,848,433 B2
DATED : February 1, 2005
INVENTOR(S) : Scoggins, Donald B.

It is certified that error appears in the above-identified patent and that said Letters Patent is hereby corrected as shown below:

<u>Title page,</u>
Item [76], Inventor, delete "424 32 Rd., #84, Clifton, CO (US) 81520" insert
-- 554 25 Road #8, Grand Junction, CO, (US) 81505 --.

Signed and Sealed this

Thirtieth Day of August, 2005

JON W. DUDAS
*Director of the United States Patent and Trademark Office*